Oct. 22, 1957 E. O. KEIZER ET AL 2,810,825

AUTOMATIC GAIN CONTROL MEANS

Original Filed Aug. 23, 1952 2 Sheets-Sheet 1

INVENTORS
EUGENE O. KEIZER &
MARLIN G. KROGER

BY Olin O. Mitchell
ATTORNEY

AUTOMATIC GAIN CONTROL MEANS

Original Filed Aug. 23, 1952 2 Sheets-Sheet 2

INVENTORS
EUGENE O. KEIZER &
MARLIN G. KROGER
BY [signature]
ATTORNEY

United States Patent Office 2,810,825

Patented Oct. 22, 1957

2,810,825

AUTOMATIC GAIN CONTROL MEANS

Eugene O. Keizer, Princeton, N. J., and Marlin G. Kroger, Oak Park, Ill., assignors to Radio Corporation of America, a corporation of Delaware

Original application August 23, 1952, Serial No. 306,004, now Patent No. 2,735,002, dated February 14, 1956. Divided and this application January 4, 1954, Serial No. 402,007

14 Claims. (Cl. 250—20)

Figure 1:
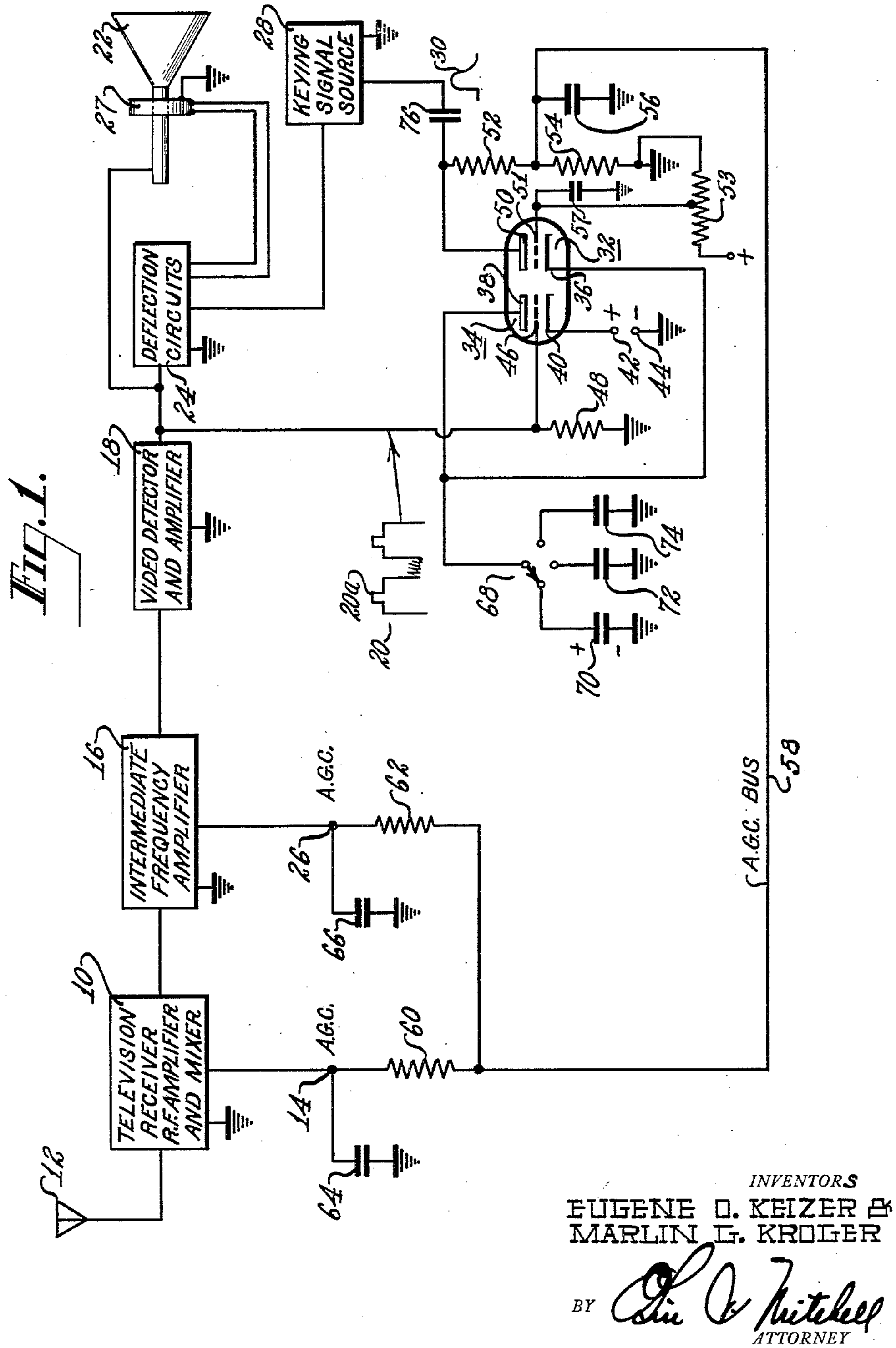

The present invention relates to improvements in automatic gain control circuits for radio receiving systems and more particularly, although not necessarily exclusively, to automatic gain control systems of the type used in television signal receivers.

This case is a division of U. S. Patent No. 2,735,002, entitled, "Sync Separator and AGC Circuits for TV Receivers," issued February 14, 1956, by Eugene O. Keizer, et al.

It is well known in the television art and radio art that automatic gain control systems for television receivers require special consideration and are not as simple and straightforward as automatic gain control circuits for broadcast AM radio receivers. The most popular type of automatic gain control circuit for television receiving systems is based upon the fact that the synchronizing signal components of the transmitted television signal are transmitted at a fixed percentage of carrier modulation. Actual carrier intensity at a given receiving location can, therefore, be measured as a function of the magnitude of the demodulated synchronizing signal components of the television signal.

It was common practice in the early stages of the television art to merely peak-detect the received and demodulated television signal. Since, in accordance with United States RTMA television signal standards, the synchronizing signal component of the television signal defines the signal peaks, it was convenient to merely peak-detect the received signals and develop a voltage useful as an automatic gain control voltage. This approach was satisfactory except in areas where noise pulses exceeding the height of sync signal peaks were frequently present. In such cases, the gain of the television receiver would often times drop to a very low value, with a consequent destruction of the received picture, in response to a heavy noise burst. To overcome this basic disadvantage, keyed automatic gain control systems were developed in which the intensity of the received signal is sampled only during the synchronizing signal period. This was most expeditiously accomplished by keying a peak detector on only during the horizontal deflection circuit flyback time. Noise pulses occuring between horizontal synchronizing intervals would, therefore, be excluded and prevented from influencing the charge developed by the keyed peak detector. The basic difficulty with a keyed automatic gain control circuit is in the case of in the reception of strong signals. Under such conditions, the horizontal deflection circuits may establish a locked-out relation with respect to arriving sync which produces wide black horizontal bands across the received picture. This results from the fact that the initial gain of the receiver circuit upon first encountering the strong signal is so great that the horizontal deflection circuits synchronize upon a portion of the television signal other than the horizontal synchronizing pulse. Thus, in the case of strong signals, it becomes advisable to have a type of non-keyed AGC to prevent horizontal lock-out.

The present invention provides a simple and economical form of automatic gain control circuit especially suited for television receiving systems which may be easily adjusted to operate either as a keyed or non-keyed automatic gain control circuit. In this way, automatic gain control circuit operation can be manually tailored to best accord with the general intensity of signals being received.

It is, therefore, an object of the present invention to improve the immunity of television receivers to noise impulses.

It is another object of the present invention to provide a simple and economical automatic gain control circuit which may be easily adjusted for keyed or non-keyed operation.

It is still another purpose of the present invention to provide an automatic gain control circuit which may be easily adjusted in relation to incoming signals to provide optimum performance.

In the realization of the above objects and features of advantage, the present invention contemplates the use of two amplifier devices connected in series relationship with one another. Storage capacitance means is connected at the junction of the two amplifying devices so as to develop a potential representing the current passed by one of the amplifying devices. The other amplifier device is, therefore, in a discharging relation to the storage capacitance means. By applying keying pulses to the output electrode of the charging amplifier device, rectified pulses in its output circuit may be integrated to produce a voltage of a suitable polarity and magnitude for automatic gain control use. By applying incoming video signal to the discharging amplifier device, a control over the voltage developed in the output circuit of the first discharge device may be obtained in a manner useful for automatic gain control purposes.

Figure 2:
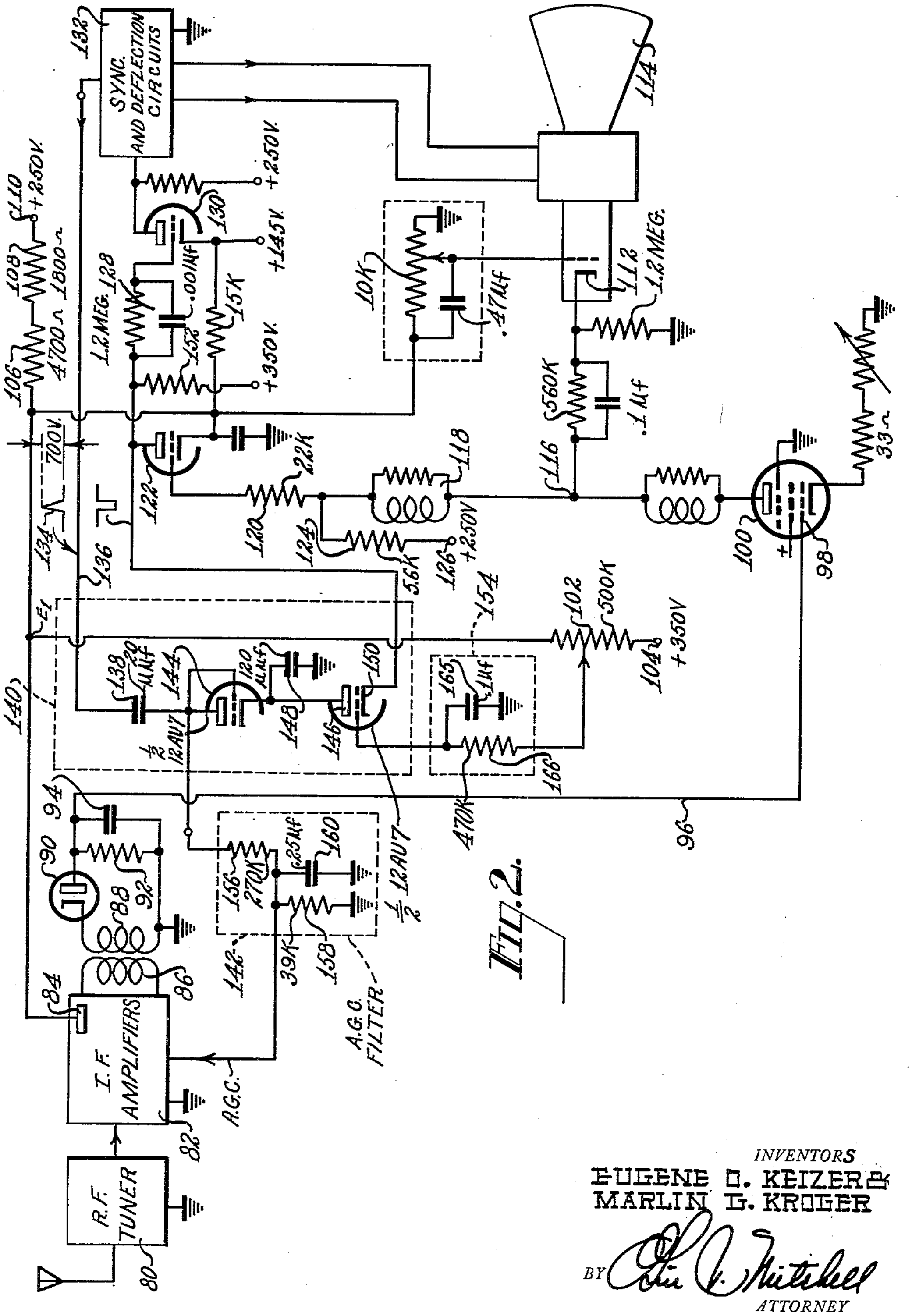

A better understanding of the present invention as well as other of its objects and features of advantage will become apparent from a reading of the following specification, especially when taken in connection with the accompanying drawings, in which:

Figure 1 is a combination block and schematic diagram of one form of the present invention; and Figure 2 is a combination block and schematic diagram of still another form of the present invention.

In Figure 1, there is illustrated in block form at 10 a typical television receiver, R.-F. amplifier and mixer stage system. Received television signals are intercepted by the antenna 12 and applied to the television receiver. An automatic gain control terminal 14 is designated to receive a gain control voltage which in a conventional manner controls the signal gain of the system embraced by the block 10. In accordance with well known television receiver design, the block 10 is coupled with an intermediate frequency amplifier 16 whose output terminal is in turn connected with the video detector and amplifier system 18. Demodulated and amplified video signal 20 appearing at the output terminal of the video detector and amplifier system 18 is applied to a kinescope 22 to control the beam current therein in accordance with picture information. Video signal 20 is also applied to suitable deflection circuits 24 which are in turn coupled with a deflection coil means 27 surrounding the neck of the kinescope 22. It is noted that the intermediate frequency amplifier 16 is also provided with an automatic gain control terminal 26 to which an automatic gain control voltage may be applied to control the gain of the intermediate frequency amplifier 16.

In order to derive a keying signal for use with the invention, hereinafter to be described, means represented by block 28 have been shown connected with the deflection circuits 24 for developing a keying waveform 30. The keying waveform 30 is synchronous with the horizontal synchronizing pulses of the received television signal which in turn synchronizes the deflection circuit 24.

Details of suitable circuitry for the block diagram representation thus far shown or described my be found in an article entitled "Radio Set and Service Review" appearing in the Radio Electronics magazine, November 1953, pages 34 through 36.

In accordance with the present invention, two amplifier means, such as electron discharge tube sections 32 and 34 are connected in series with one another across the keying signal source 28. Thus the cathode 36 of the amplifier 32 is connected with the anode 38 of the amplifier 34. The cathode 40 of the amplifier 34 is connected with circuit ground through a source of bias potential having a positive terminal at 42 and a negative terminal at 44. This bias potential maintains the control electrode 46 at a negative potential with respect to the cathode 40. This occurs since the control electrode 46 is returned to circuit ground through a grid leak resistor 48.

The anode 50 of the amplifier 32 is connected with circuit ground through a load resistor means comprising resistors 52 and 54. A capacitor 56 is connected in shunt with the resistor 54 to produce a suitable time constant for the AGC bus 58. Automatic gain control potential appearing on the AGC bus 58 is applied to the AGC terminals 14 and 26, respectively, of the R.-F. amplifier and mixer 10 and intermediate frequency amplifier 16 through isolating resistors 60 and 62. Conventional decoupling capacitors or by-pass capacitors 64 and 66 are connected from the AGC terminals 14 and 26 to circuit ground.

In further accordance with the present invention, means are provided for connecting or imposing a capacitance between the cathode 36 and circuit ground. The value of this capacitance may be made variable by means of a switch 68 acting in combination with capacitors 70, 72 and 74. Keying pulses from the keying signal source 28 are applied to the anode 50 of the amplifier 32 by means of the capacitor 76.

In the operation of the present invention, keying pulses 30 will be effectively rectified or peak-detected by means of the amplifier device 32 so as to charge the capacitor 70 with a positive polarity potential on its upper plate. For a given amplitude of keying pulse 30 it will be seen that less and less current will be passed by the amplifier 32 as the capacitor 70 charges to the peak value of the keying pulse 30. During the charging process, however, current will necessarily flow through resistors 52 and 54 connected with the anode 50 of the amplifier 32. This will mean that initially a highly negative voltage will appear at the upper terminal of resistor 54 the value of which will gradually diminish as the voltage on capacitor 70 builds up.

In accordance with the present invention, incoming video signal 20 is applied to the control electrode 46 of the amplifier 34. Under such conditions, and with the polarity of the applied video signal as shown, synchronizing signal peaks such as 20*a* of the signal waveform 20 will tend to cause conduction in the amplifier 34. This assumes of course that the bias supply connected with the cathode circuit 40 is of sufficient magnitude to maintain the amplifier 34 in normally non-conducting state. The sync pulse 20*a* will of course tend to discharge the capacitor 70 due to conduction in the amplifier 34. This will immediately cause the amplifier 32 to conduct in an effort to recharge the capacitor 70 to the peak value of the keying pulse 30. The charging current of the amplifier 32 will in turn develop a negative voltage across the resistor 54 which is applied to the AGC terminals 14 and 26 to reduce the gain of the receiver system.

Upon stabilization of the circuit after a few seconds of signal reception, the amount that the capacitor 70 is effectively discharged by incoming synchronizing signals will be made up by conduction in amplifier 32. The magnitude of this conduction will be governed by the negative voltage appearing at the upper extremity of the resistor 54. Should the signal decrease due to atmospheric fading or other causes, the magnitude of the sync peaks 20*a* will drop. Capacitor 70 will then no longer be discharged to the same extent on successive synchronizing pulses. This will reduce the amount of current flow through the amplifier 32 in recharging the capacitor 70 and the potential at the upper extremity of resistor 54 will become negative. This will, of course, tend to increase the gain of the television receiver system to compensate for the reduction in signal strength.

It is evident that if the capacitors 72 and 74 are made sufficiently small, a keyed type of automatic gain control circuit action may be obtained. For example, if the switch means 68 were positioned so as to apply a capacitor 72 of less value than the capacitor 70, it will follow that the voltage drop across capacitor 72 for or during a given horizontal line period due to the reception of synchronizing pulses would be greater than for capacitor 70. This assumes a given conductivity of the amplifier 34 for a given amplitude of received synchronizing signal. However, as the capacitor 72 is made smaller in value, less energy will be required from the amplifier 32 to recharge it and hence a smaller average current flow will pass through resistor 54. This will result in less AGC voltage development. If, however, the keying pulse 30 and the incoming synchronizing signal 20*a* occur simultaneously, the current passing through the amplifier 32 would be comparable to the condition obtained when the large capacitor 70 was in the circuit. Thus the AGC voltage developed across resistor 54 will be more largely a function of keyed circuit action than of unkeyed circuit action. In the ultimate, if capacitor 74 is made smaller than capacitor 72 or indeed the capacitor 74 is made to be virtually zero, the AGC voltage developed across resistor 54 will represent wholly keyed circuit action.

Thus, in weak signal areas, switch means 68 may be positioned to a very small capacitor whereby to provide a keyed circuit action which gives maximum noise immunity. On the contrary, in strong signal areas, switch means 68 may be positioned to provide a capacitor of rather large value so that the AGC voltage developed across resistor 54 is independent of coincidence between the keying pulse 30 and the arriving synchronizing signal 20*a*.

It is noted that the control electrode of the amplifier 32 is maintained at a substantially zero alternating current impedance with respect to circuit ground by means of the capacitor 57. This is desirable in accordance with the present invention in order for the control electrode to act as a shield between the anode 50 and the cathode 36. With the control electrode acting as a shield the keying pulses 30 will not produce erroneous triggering of the deflection circuits through the interelectrode capacitance of amplifier 34. Where such considerations are not a problem it is apparent that the control electrode of the amplifier 32 may be connected with the anode 50 or the amplifier 32 and under such circumstances may be replaced by a simple diode. To afford shielding between the anode and the cathode of the amplifier 32, the time constant of the grid circuit resistance and the capacitor 57 should be several times the interval between consecutive horizontal synchronizing pulses. The control electrode 51 is connected with a point on the bleeder resistor 53. Bleeder resistor 53 is connected between a source of positive potential and circuit ground. This permits the grid 51 to be operated at a positive value of potential with respect to circuit ground which is negative with respect to cathode 36 only by an appropriate bias potential value for the amplifier 32.

In the embodiment of the invention illustrated in Figure 2, shown and described at length in the above-identified United States patent application copending, Serial No. 306,004, of which this is a division, an R.-F. tuner 80 is connected in driving relationship to an intermediate amplifier chain 82. For purposes of convenience in illustrating the operation of the present invention, the anode 84 of the final intermediate frequency amplifier tube in the intermediate frequency amplifier chain has been shown. The anode 84 is also coupled by means, not shown, to the primary of an intermediate frequency coupling transformer 86, whose secondary 88 is coupled with the diode 90 and circuit ground. Diode 90 acts as a video signal demodulating means with the resistor 92 and capacitor 94 acting as a demodulator load circuit. Demodulated video signal is conveyed via circuit path 96 to the control electrode 98 of video signal amplifier discharge tube 100. Polarizing voltage for the anode 84 of the I.-F. amplifier chain is obtained through resistor 102 from the power supply terminal 104 and through resistors 106 and 108 from the power supply terminal 110.

Amplified video signal delivered by the video amplifier tube 100 is applied to the cathode 112 of the kinescope 114 on a direct current coupled bias whereby to preserve direct current picture information in the reproduced scene. Video signal available at point 116 in the load circuit of the video amplifier 100 is also conveyed via the peaking circuit 118 and resistor 120 to the control electrode of the sync separator tube 122. Direct current for polarization of the anode of amplifier 100 is obtained through resistor 124 from the power supply source terminal 126. Output signal from the sync separator 122 is coupled via the network 128 to the control electrode of the sync amplifier 130. Output signal from the amplifier 130 is applied to the sync and deflection circuits illustrated in block form at 132. Well known horizontal flyback pulse signal 134, conventionally available across a portion of a horizontal output deflection circuit, is conveyed via the circuit path 136 and capacitor 138 to the automatic gain control circuit which forms the subject matter of the present invention.

The automatic gain control circuit of the present invention is embraced in the dotted line rectangles 140 and 142 and comprises an electron discharge tube 144, serially connected with electron discharge tube 146. The capacitor 148 is connected from the junction of tubes 144 and 146 to circuit ground. Instead of the cathode 150 of tube 146 being connected with a source of positive potential, the cathode 150 is connected with the upper extremity of the signal separator load resistor 152. The control electrode of tube 146 is connected through a novel noise charging circuit 154 to a point along resistor 102 which forms a part of the load circuit for the last video I.-F. amplifier whose anode is shown at 84. An automatic gain control load circuit across which is developed an automatic gain control voltage, shown connected with the anode of tube 144, and comprises resistors 156, 158 and capacitor 160.

In the operation of the automatic gain control circuit shown in Figure 2, demodulated video signal delivered by the diode 90 is coupled to the video amplifier 100, whose output load circuit is connected with the control electrode of sync separator 122. As described in the above-identified United States patent application, the clipping threshold of the sync separator 122, as well as the bias on the kinescope 114 is rendered a function of received signal strength by connecting the cathode of the tube 122 to the left hand extremity of resistor 106. In this way as the gain of the intermediate frequency amplifier whose anode is shown at 84 is changed as a function of AGC signal, the clipping threshold on the sync separator 122 will change. Separated sync will cause the cathode 150 of the lower AGC triode 146 to swing in a negative direction. This corresponds to the arrangement shown in Figure 1, where received synchronizing signal causes the control electrode of triode section 34 to swing positively with respect to its cathode 40. Capacitor 148 in Figure 2 corresponds to whatever total capacitance is established between the cathode 36 and circuit ground in Figure 1. This value of capacitance in Figure 1 is made controllable by the switch 68. This expediency of selecting the operating value of this capacitance has been omitted in Figure 2. for purposes of illustrational clarity. The triode 144 in Figure 2, corresponds to the triode 32 in Figure 1. In Figure 2, however, the control electrode of the triode has been directly connected with the anode to provide diode action as described hereinabove in connection with Figure 1.

With the exception of the connection of the control electrode of triode 146 to the tap on resistor 102, through a noise charging circuit 154, the basic automatic gain control circuit of Figure 2 is substantially identical to that of Figure 1 and operates in accordance with the principles described in the discussion of Figure 1 above. The novel noise charging circuit 154 operates as follows: When noise occurs conduction in the triode section 146 is increased and grid current results. When grid current occurs electrons accumulate a negative charge on the ungrounded plate of the capacitor 165, thus reducing the potential applied to the control electrode at the triode 146. The negative charge accumulated on the capacitor 165 leaks through the resistor 166. The time constant of the capacitor 165 and resistor 166 is preferably several horizontal lines or more. A reduction in potential at the control electrode of the tube 146 tends to reduce the conduction in this triode. This reduction in potential has the same effect on the conduction in the triode 146 as would a reduction in incoming signal strength.

Thus, the occurrence of impulse noise which has the same effect on an automatic gain control circuit as an increase in incoming signal strength will also develop through the action of the noise charging section 154, another effect similar to a reduction of incoming signal strength compensating action is, therefore, seen to take place.

It will be noted that as the time constant of the noise charging circuit 154 is sufficiently long, the noise charging circuit will over-compensate for noise, viz., the occurrence of noise will have the same effect on the AGC circuit as the reduction of incoming signal strength. If the time constant is too short, there will be under-compensation for noise. In the circuit of Figure 2, no critical balance of compensation is required. It is better to have over-compensation because in that case, the signal appears weaker to the AGC than when noise occurs. This makes the AGC increase the amplification of the received signal to the extent that the tips of the synchronizing pulses get closer to the upper clipping level of the synchronizing signal separator 122, thus reducing the amount of noise delivered to the deflection circuits.

What is claimed is:

1. In a radio receiver adapted to receive signals of the television type which include recurrent synchronizing pulses, an automatic gain control circuit comprising: two unilateral conduction devices each having at least two electrodes; means connecting together one electrode of a first and one electrode of a second of said two unilateral conduction devices to a common point in such a way that the direction of greater conductivity of one of said unilateral conduction devices is toward said common point and that of the other is away from said common point; a storage capacitor connected between said common point and a point of reference potential; means to apply to another electrode of the first of said unilateral conduction devices intermittent voltages with such polarity as to increase the conduction through said first unilateral conduction device so that said capacitor charges; means to apply to another electrode of the second of said unilateral conduction devices synchronizing pulses with such polarity as to increase the conduction through said second unilateral conduction device so that said capacitor discharges; and means to connect said other electrode of said first unilateral conduction device to said receiver to control its gain.

2. An automatic gain control circuit according to claim 1, wherein means are provided for applying a fixed bias to said second unilateral conduction device.

3. An automatic gain control circuit according to claim 1, wherein means are provided for applying a variable bias to said second unilateral conduction device said means comprising a resistor connected between an electrode of said second unilateral conduction device and an electron collecting electrode of one of the receiver's intermediate frequency amplifiers.

4. An automatic gain control circuit according to claim 3, wherein a capacitor is connected between the end of said resistor remote from said electron collecting electrode and a point of reference potential whereby said capacitor receives a charge tending to reduce the conduction in said second unilateral conduction device when the conduction in the second unilateral conduction device increases beyond a given level.

5. In a radio receiver adapted to receive signals of the television type which include recurrent synchronizing pulses, an automatic gain control circuit comprising: two normally non-conductive unilateral conduction devices each having at least two electrodes; means connecting together one electrode of a first and one electrode of a second of said two unilateral conduction devices to a common point in such a way that the direction of greater conductivity of one of said unilateral conduction devices is toward said common point and that of the other is away from said common point; a storage capacitor connected between said common point and a point of reference potential; means to apply to another electrode of the first of said unilateral conduction devices intermittent voltages with such polarity as to render conductive said first unilateral conduction device so that said capacitor charges; means to apply to another electrode of the second of said unilateral conduction devices synchronizing pulses with such polarity as to render conductive said second unilateral conduction device so that said capacitor discharges; and means to connect said other electrode of said first unilateral conduction device to said receiver to control its gain.

6. In an automatic gain control circuit, the combination of: a signal amplifier having a gain control terminal to which a gain control potential may be applied to control the gain of said amplifier, said amplifier having a signal delivery terminal; a first and a second electron discharge tubes connected in series with one another to form a combination capable of unilateral current conduction, the first of said tubes having a control electrode; a source of power supply signal comprising a recurrent alternating current waveform; conections placing said combination in shunt with said power supply source; a time constant load circuit connected with said first tube for developing a unidirectional voltage in accordance with current flow through said first tube; means coupling said load circuit with said gain control terminal; and means coupling said first discharge tube control electrode with said amplifier signal delivery terminal.

7. An automatic gain control circuit, according to claim 6, wherein there is additionally provided a capacitor connected in shunt with said second tube, the value of said capacitor being such that when combined with any terminal circuit resistance across said second tube there is formed a time constant circuit of value longer than the period of said power supply signal recurrent component.

8. An automatic gain control circuit, according to claim 6, wherein there is additionally provided a time constant circuit included in said control electrode coupling means, said time constant circuit having a time constant value several times longer than the period of said power supply signal recurrent component.

9. An automatic gain control circuit, according to claim 6, wherein said first discharge tube includes a control electrode; wherein there is additionally provided coupling means connected between said control electrode and a point within said time constant load circuit.

10. In an automatic gain control circuit, the combination of: a source of electrical signal having a cyclically recurrent signal component; an amplifier having an automatic gain control terminal, said amplifier being coupled with said signal source; means coupled with said amplifier for developing a keying signal synchronously related to said recurrent signal component; a capacitor; unilateral conduction means coupled between said keying signal source and said capacitor in charging relation to said capacitor; controllable impedance means coupled with said capacitor in discharging relation thereto, said controllable impedance means having a control terminal adapted to receive an impedance control signal for determining the impedance value of said impedance means; signal coupling means connected between said control terminal and said source of electrical signal; current responsive means coupled with said unilateral conduction means for developing a potential as a function of current flow through said unilateral conduction means; and a connection from said last named means to said amplifier automatic gain control terminal.

11. In a television receiver, the combination of: an automatic gain control system operatively included in said receiver for minimizing the effects of variations in received signal strength by varying the overall signal gain of said receiver as an inverse function of received signal amplitude; an amplifier device included in said automatic gain control system, said amplifier device having an input circuit connected to accept electrical variations derived from received television signals and an output circuit for developing an automatic gain control voltage for said gain control system in accordance with signals accepted by said input circuit, said amplifier device developing increased automatic gain control potential in response to received signal noise; means operatively included in said receiver and responsive to signal noise received thereby to develop a noise compensating potential, the magnitude of which is a function of the magnitude of received signal noise; and means applying said noise compensating potential to said automatic gain control system in such a manner and electrical sense as to reduce the degree of automatic gain control voltage change otherwise attributable to received signal noise.

12. In a television receiver automatic gain control circuit, the combination of: a source of demodulated television signals having random noise excursions exceeding the amplitude of television synchronizing components; means having an input circuit operatively coupled to said source and an output circuit in which is developed an automatic gain control voltage the magnitude of which is a positive function of the amplitude of signals applied to said input circuit and characterized in that noise components exceeding the amplitude of synchronizing components tend to produce unwanted increases in the developed automatic gain control voltage; means operatively coupled to said signal source and responsive to substantially only received signal noise excursions to develop a noise correcting potential; and means operatively coupled with said noise correcting potential developing means and said automatic gain control voltage developing means for reducing the magnitude of developed automatic gain control potential in response to received signal noise by an amount substantially equal to the amount of said unwanted automatic gain control voltage increase whereby variations in the automatic gain control potential delivered by said automatic gain control circuit attributable to received signal noise are minimized.

13. In a television receiver for receiving broadcast television signals which include a relatively low amplitude video component, a relatively high amplitude periodically recurrent synchronizing component, and random noise contamination having excursions of an amplitude in excess of said synchronizing component, the combination of: signal datum means to which elements of said receiver and signals handled thereby are electrically referenced; a source of demodulated television signal referenced to said datum means, said signal including at least said synchronizing component and said random noise contamination excursions; an automatic gain control circuit operatively included in said receiver for minimizing the effects of variations in received signal intensity, said automatic gain control circuit including an amplifier device having an input electrode and at least two output electrodes, one of said output electrodes being alternating current referenced to said datum means, said automatic gain control circuit further including a galvanically conductive input circuit comprising a first resistor connected between said input electrode and said datum referenced output electrode, and a galvanically conductive output circuit comprising a second resistor across which said amplifier device develops an automatic gain control voltage, said output circuit being operatively connected between said two output electrodes, said amplifier device being characterized in that current flow is established between said input electrode and said datum referenced output electrode when voltage excursions of predetermined polarity between said input electrode and said datum referenced output electrode exceed a predetermined minimum amplitude; means operatively coupled with and responsive to said source of demodulated television signal to produce a signal waveform referenced to said datum means having amplitude variations corresponding to said synchronizing component and said noise contamination excursions such that amplitude variations corresponding to said noise excursions randomly exceed in amplitude those variations representing said synchronizing signal, said noise excursions being of said predetermined polarity and exceeding in amplitude said predetermined minimum; a time constant network having a time constant value longer than the periodicity of said synchronizing component; and means operatively connecting said time constant network with said input circuit such that said time constant network is charged in response to current flow between said input electrode and said datum referenced output electrode to develop a noise correcting potential whereby said amplifier device is rendered less effective upon receiving noise excursions producing current flow in said input circuit.

14. In a television receiver designated to receive and demodulate a radio carrier modulated with television signals including a relatively low amplitude video component, relatively high amplitude periodically recurrent synchronizing component, and random noise contamination having excursions of an amplitude in excess of said synchronizing component, the combination of: a signal amplifier operatively connected to amplify received signals; an automatic gain control means operatively connected with said amplifier means for controlling the gain of said amplifier means in accordance with an automatic gain control potential, the value of which is a function of the amplitude of received synchronizing component; means included in said automatic gain control means responsive to random noise contamination excursions having an amplitude in excess of said synchronizing component to develop a correcting potential the value of which is a positive function of the degree that said random noise excursions exceed in amplitude the said synchronizing component; and means so connecting said last named means in said automatic gain control means that said developed noise correcting potential operates to increase the gain of said amplifier for a predetermined period following the reception of random noise contamination.

References Cited in the file of this patent

UNITED STATES PATENTS

| | | |
|---|---|---|
| 2,266,516 | Russell | Dec. 16, 1941 |
| 2,332,681 | Wendt | Oct. 26, 1943 |
| 2,593,011 | Cotsworth | Apr. 15, 1952 |